US012504555B2

(12) United States Patent
Zhou et al.

(10) Patent No.: US 12,504,555 B2
(45) Date of Patent: Dec. 23, 2025

(54) SCANDIUM TARGET FOR A NEUTRON GENERATOR FOR WELLBORE LOGGING

(71) Applicant: Halliburton Energy Services, Inc., Houston, TX (US)

(72) Inventors: Zilu Zhou, Needham, MA (US); Weijun Guo, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 741 days.

(21) Appl. No.: 17/731,559

(22) Filed: Apr. 28, 2022

(65) Prior Publication Data

US 2023/0350094 A1 Nov. 2, 2023

(51) Int. Cl.

| | |
|---|---|
| ***G21G 4/02*** | (2006.01) |
| ***G01V 5/10*** | (2006.01) |
| ***H05H 3/06*** | (2006.01) |

(52) U.S. Cl.

CPC ................. *G01V 5/10* (2013.01); *G21G 4/02* (2013.01); *H05H 3/06* (2013.01)

(58) Field of Classification Search

CPC . G01V 5/10; G01V 5/107; G21G 4/02; H05H 3/06; E21B 49/00; E21B 47/00

See application file for complete search history.

(56) References Cited

U.S. PATENT DOCUMENTS

| | | | | |
|---|---|---|---|---|
| 3,683,190 A * | 8/1972 | Stark | H05H 6/00 376/151 |
| 3,775,216 A * | 11/1973 | Frentrop | H01J 27/02 376/151 |
| 4,622,688 A | 11/1986 | Diemer et al. | |
| 4,935,194 A * | 6/1990 | Verschoore | H05H 3/06 376/151 |
| 5,215,703 A * | 6/1993 | Bernardet | H05H 3/06 376/116 |
| 5,293,410 A | 3/1994 | Chen et al. | |
| 9,793,084 B2 | 10/2017 | Reijonen et al. | |

(Continued)

FOREIGN PATENT DOCUMENTS

KR 20060062750 A1 * 6/2006 ............... G21G 1/04

OTHER PUBLICATIONS

Guo, et al. : "Effect of target material on neutron output and sputtering yield of D-D neutron tube", Nuclear Instruments and Methods in Physics Research Section B: Beam Interactions with Materials and Atoms, vol. 473, Jun. 15, 2020, pp. 48-54, available online Apr. 21, 2020 (Year: 2020).*

(Continued)

*Primary Examiner* — Lisa M Caputo

*Assistant Examiner* — Toni D Sauncy

(74) *Attorney, Agent, or Firm* — Kilpatrick Townsend & Stockton LLP

(57) ABSTRACT

A downhole neutron generator includes a housing, a gas reservoir positionable within the housing, a target rod positionable within the housing and having a longitudinal axis aligned with a central axis of the housing, an ion source positionable adjacent to the gas reservoir and between the target rod and the gas reservoir, and a target positionable on a surface of the target rod facing the ion source. The target includes a first metal layer on the surface of the target rod and a second metal layer positionable adjacent to the first metal layer facing the ion source. The second metal layer is a scandium layer.

20 Claims, 6 Drawing Sheets

(56) References Cited

U.S. PATENT DOCUMENTS

| | | | | |
|---|---|---|---|---|
| 10,502,861 | B2 | 12/2019 | Navarro-Sorroche et al. | |
| 2009/0108192 | A1 | 4/2009 | Groves | |
| 2010/0215136 | A1* | 8/2010 | Rusnak | H05H 1/06 376/108 |
| 2016/0143123 | A1 | 5/2016 | Groves et al. | |
| 2017/0018392 | A1 | 1/2017 | Cheng | |
| 2019/0219731 | A1 | 7/2019 | Navarro-Sorroche et al. | |
| 2021/0132252 | A1* | 5/2021 | Teague | G01V 5/108 |

OTHER PUBLICATIONS

Guo, et al.: “Effect of target film materials on neutron yield of neutron tube with drive-in target”, Radiation Physics and Chemistry, vol. 182, May 2021, available online Jan. 2021 (Year: 2021).*

International Search Report and Written Opinion, PCT/US2022/026680, Jan. 25, 2023, 11 pages.

Chen et al., “A New Cased-Hole 2 ⅛ in. Multi-Detector Pulsed-Neutron Tool: Theory and Characterization”, SPWLA 56th Annual Logging Symposium, Long Beach, CA, Jul. 18-22, 2015, 11 pages.

Halliburton, “RMT-3D™ 2 ⅛-in. Reservoir Monitor Tool for Oil, Water, and Gas Saturations”, Product Sheet available at https://www.halliburton.com/en/products/reservoir-monitor-tool-3-detector, 2019, 2 pages.

Schlumberger, “EcoScope, Multifunction LWD Service”, Product Sheet available at https://www.slb.com/drilling/surface-and-downhole-logging/logging-while-drilling-services/ecoscope-multifunction-lwd-service, 2017, 3 pages.

Schlumberger, “Litho Scanner High-definition spectroscopy service”, Brochure available at https://www.slb.com/-reservoir-characterization/surface-and-downhole-logging/wireline-openhole-logging/litho-scanner-spectroscopy, 2017, 20 pages.

Schlumberger, “Pulsar Multifunction spectroscopy service”, Product Sheet available at https://www.slb.com/reservoir-characterization/surface-and-downhole-logging/wireline-cased-hole-logging/pulsar-spectroscopy, 2019, 2 pages.

* cited by examiner

SCANDIUM TARGET FOR A NEUTRON GENERATOR FOR WELLBORE LOGGING

TECHNICAL FIELD

The present disclosure relates generally to neutron generators and, more particularly (although not necessarily exclusively), to targets of neutron generators in wellbores.

BACKGROUND

Wells can be drilled to access and produce hydrocarbons such as oil and gas from subterranean geological formations. Wellbore operations can include drilling operations, completion operations, fracturing operations, and production operations. Drilling operations may involve gathering information related to downhole geological formations of the wellbore. The information may be collected by wireline logging, logging while drilling (LWD), measurement while drilling (MWD), drill pipe conveyed logging, or coil tubing conveyed logging. Neutron generators may be used in a logging tool for collecting information at high temperatures.

DETAILED DESCRIPTION

Figure 1:
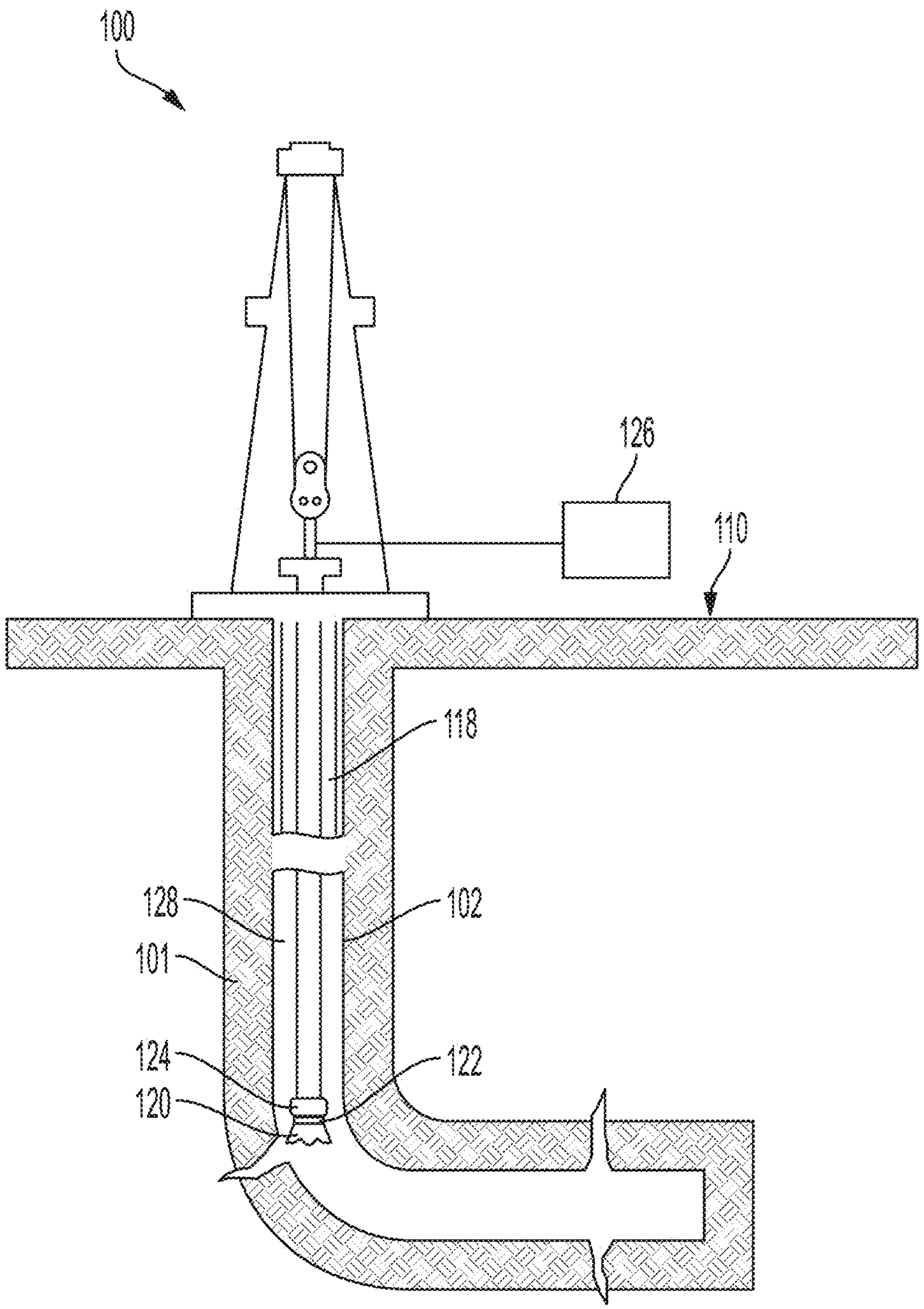
FIG. 1 is a schematic of a well system that can use a scandium target for a neutron generator according to one example of the present disclosure.

Certain aspects and examples of the present disclosure relate to a neutron generator having a scandium target. Neutron generators generate neutrons by fusing isotopes of hydrogen together. Common isotopes of hydrogen include deuterium gas and tritium gas. Neutron generators may be deployed as a downhole tool during wellbore operations to measure downhole geological formations in a wellbore. A target of a neutron generator can include at least one metal layer positioned on a target rod. The metal layer can be loaded with the deuterium (D) and tritium (T) gas, such that when an ion beam of deuterium and tritium ions is accelerated towards the target, the neutrons can be generated. The target can include a first metal layer, such as a titanium layer, a yttrium layer, a zirconium layer, or a vanadium layer, positioned on a surface of the target rod and a second metal layer, such as a scandium layer, positioned adjacent to the first metal layer and facing the ion beam.

The scandium layer can provide benefits over conventional targets primarily made of titanium or zirconium. For example, scandium may not degas until an ambient temperature reaches more than 450° C., so that the target $D_2$ and $T_2$ gas content, and hence the neutron yield, is stable regardless of target temperature rises due to the ion bombardment, especially during operations at elevated temperatures. Additionally, at a given high voltage value for operation, the incident ions can penetrate deeper into the scandium layer to bombard more target $D_2$ and $T_2$ gas particles for fusion reactions to generate more neutrons and give a higher neutron yield than a titanium layer. Scandium may also erode more slowly than titanium, which can prolong the lifetime of the target and hence the neutron generator. Zirconium, similar to titanium, absorbs and desorbs hydrogen gases, but has higher mass and density than titanium, which is not ideal to be used as a target. Thus, the scandium layer can improve performance and lifetime of neutron logging tools used in wellbore operations.

A neutron generator can include a sealed tube as a housing, a gas reservoir for providing gas, an ion source for generating ions that can be accelerated by a high voltage system or other means to a certain energy, and a target for facilitating DD or DT fusion reactions to generate neutrons. Because $D_2$ or $T_2$ or a mixture of $D_2$ and $T_2$ is in a gaseous form, the target can be a thin metal foil where the gas is absorbed. The metal foil target can be a thin film deposited on a backing structure, block, or rod, which can be used for mechanical support and electrical connection. In addition, the backing structure can also be used for transferring heat generated by the ion bombardment at the thin film to outside the housing for dissipation. Thus, one of the challenges or problems is the temperature rise ($\Delta T > 50°$ C.) of the thin foil, especially when the neutron generator is operated at high ambient temperatures ($T > 150°$ C.), which is often the case inside an oil well. The target temperatures ($T + \Delta T > 200°$ C.) can cause the thin foil to degas, and effectively lower the gas concentration inside, and more importantly, decrease the neutron yield during operation.

Aspects of the present disclosure include a scandium target, or for example a scandium and titanium hybrid target, for compact neutron generators. That is, a scandium metal foil can stick via an intermediate thin metal, such as a titanium layer, onto a backing structure to form a target for facilitating the DD or DT fusion reaction to generate neutrons. Scandium is similar to titanium or zirconium in that scandium also absorbs and desorbs hydrogen gases. But, scandium has a lower mass density (2.99 g/cc) than titanium (4.5 g/cc) or zirconium (6.52 g/cc), so that the incident ions can penetrate deeper into a scandium layer to bombard more target gas particles for fusion reactions to generate more neutrons. Additionally, based on the penetrating depth or ranges of 100 keV $D_2$ ions, zirconium (~0.3 μm) is the worst, while scandium (~0.8 μm) is the best target material for generating neutrons. Further, both zirconium and titanium start to degas $D_2$ and $T_2$ gas embedded in the target at 200° C. or higher. But, scandium starts to degas at 450° C. or higher. Thus, scandium may be a better target material than titanium or zirconium.

When ions bombard the target, the target may erode due to sputtering processes. The erosion rate of scandium is about three times less than that of titanium. That is, with the same layer thickness, a scandium target can last about three times longer than a titanium target. Thus, a neutron generator with a scandium target may have about three times longer lifetime.

Scandium may not adhere well to the backing structure, particularly if the backing structure is made of copper, when directly applied as a target. But, titanium may adhere well to the backing structure. Further, an interface between titanium and copper can form an efficient diffusion barrier for hydrogen. That is, the $D_2$ and $T_2$ gas in the titanium may not tend to drift through the interface from the titanium and into the copper and thus does not deplete the gas loaded in the target layers. To get the scandium to adhere to the backing structure, an intermediate material, such as titanium, can be deposited directly on the backing structure and then the scandium can be deposited on the titanium. So, the target may be formed by a scandium layer with a thickness in a range roughly from 0.5 μm to 5.0 μm. The intermediate metal layer can be a titanium layer with a thickness in a range typically from 0.05 μm to 1.0 μm. The scandium layer and the titanium layer can be of different sizes or of different shapes. The scandium layer and the titanium layer can be co-located with respect to the backing structure. In addition, the target may include a chromium layer, with a thickness in a range from 0.05 μm to 0.5 μm, between the scandium layer and the titanium layer to enhance adhesion. But, the chromium layer may not be used to replace the titanium layer for adhesion to the backing structure. The interface between chromium and copper may not form an efficient diffusion barrier for hydrogen, and may lead to depletion of the gas loaded in the target layers.

In some examples, the ion beam can pass through an opening of a suppressor of the neutron generator and be incident on the scandium layer of the target. Both the target and suppressor can be connected to the same power supply. The neutron generator can also include a corona shield for both a voltage connection to the suppressor and for smoothening an electrical field outside the housing.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Although examples are given with respect to neutron generators used in wellbore operations, aspects of the present disclosure may be applied to neutron generators used in other operations or technology areas.

FIG. 1 is a schematic of a well system 100 that can use a scandium target for a neutron generator according to one example of the present disclosure. In this example, well system 100 is depicted for a well, such as an oil or gas well, for extracting fluids from a subterranean formation 101. The well system 100 may be used to create a wellbore 102 from a surface 110 of the subterranean formation 101. The well system 100 includes a well tool or downhole tool 118, and a drill bit 120. The downhole tool 118 can be any tool used to gather information about the wellbore 102. For example, the downhole tool 118 can be a tool delivered downhole by wireline, often referred to as wireline formation testing ("WFT"). Alternatively, the downhole tool 118 can be a tool for either measuring-while-drilling, wireline logging, or logging-while-drilling. The downhole tool 118 can include a neutron generator and a sensor component 122 for determining information about the wellbore 102. Examples of information can include rate of penetration, weight on bit, standpipe pressure, depth, mud flow in, rotations per minute, torque, equivalent circulation density, or other parameters. The downhole tool 118 can also include a transmitter 124 for transmitting data from the sensor component 122 to the surface 110. The downhole tool 118 can further include the drill bit 120 for drilling the wellbore 102.

The wellbore 102 is shown as being drilled from the surface 110 and through the subterranean formation 101. As the wellbore 102 is drilled, drilling fluid can be pumped through the drill bit 120 and into the wellbore 102 to enhance drilling operations. As the drilling fluid enters into the wellbore, the drilling fluid circulates back toward the surface 110 through a wellbore annulus 128—the area between the drill bit 120 and the wellbore 102.

Also included in the schematic diagram is a computing device 126. The computing device 126 can be communicatively coupled to the downhole tool 118 and receive data about the drilling process. Upon receiving the data, the computing device 126 can process and display the data to a user.

Figure 2:
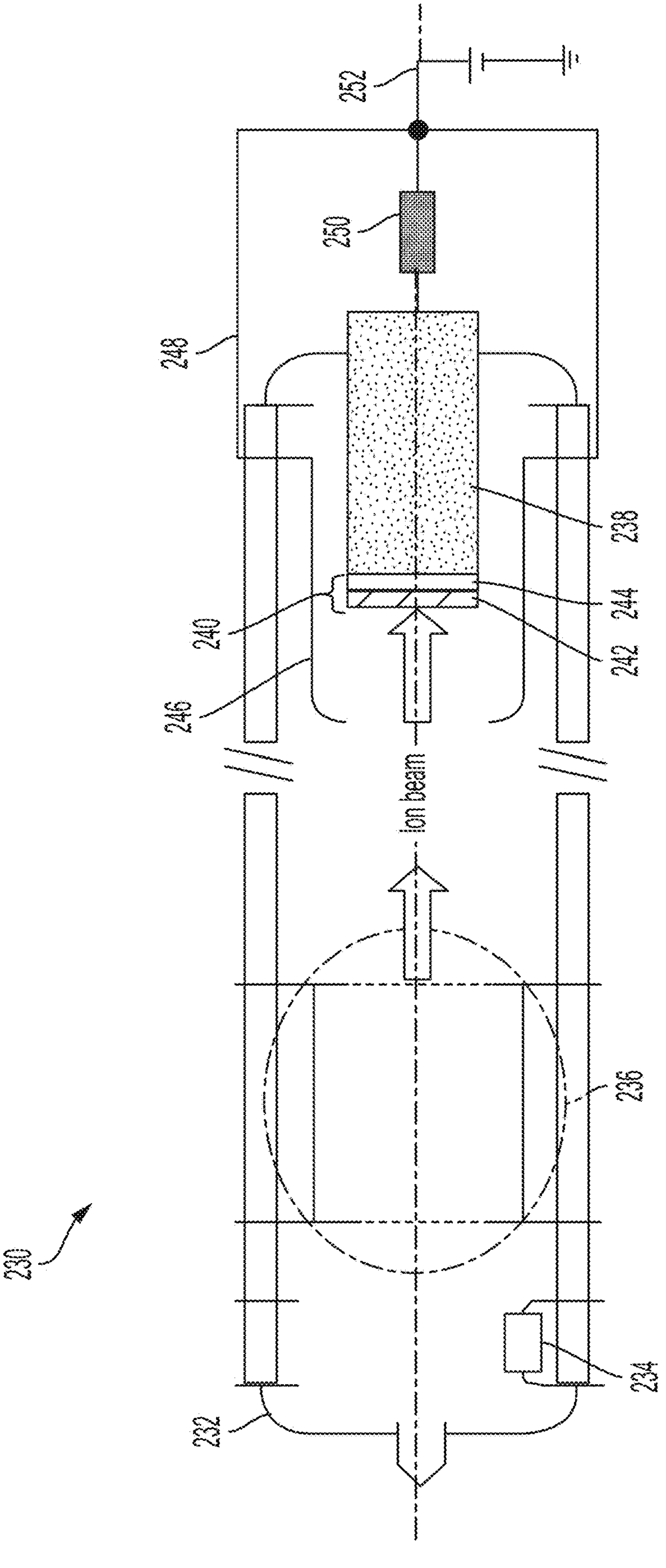
FIG. 2 is a diagram of a neutron generator with a scandium target according to one example of the present disclosure.

FIG. 2 is a diagram of a neutron generator 230 with a scandium target according to one example of the present disclosure. The neutron generator 230 can be part of a logging tool, such as downhole tool 118 in FIG. 1. The logging tool can include the neutron generator 230, sensors, and other hardware and software. The logging tool 118 can be deployed in a wellbore and communicate with surface equipment to process data gathered by the logging tool 118.

In some examples, the neutron generator 230 includes a housing 232. The housing 232 may be a cylindrical vacuum enclosure having glass or ceramic walls. Within the housing 232, the neutron generator 230 can include a gas reservoir 234, an ion source 236, a target rod 238, and a target 240. A longitudinal axis of the target rod 238 can be aligned with a central axis of the housing 232. The target rod 238 can be a copper target rod coupled to a voltage source 252, which may be a high voltage source external to the housing 232. The neutron generator 230 may additionally include a resistor 250 between the target rod 238 and the voltage source 252.

The voltage source 252 can also be coupled to a corona shield 248 that can connect to a suppressor 246, which may be an electrode. The corona shield 248 can be coupled outside of the housing 232 and provide a connection to the suppressor 246 and smoothening of an electrical field outside the housing 232. The suppressor 246 can be engineered with a bias e-field to send back or suppress the secondary electrons. The suppressor 246 can also serve as a trap for backscattered ions and sputtered particles. In an example involving the resistor 250 being two MΩ, and an incident ion beam being one-hundred μA, there can be a voltage difference of two-hundred V between the suppressor 246 and the target 240, which may be sufficient to send back secondary low-energy electrons.

In some examples, the target 240 can be positioned on a surface of the target rod 238 that faces the ion source 236. The target 240 can include a titanium layer 244 on the surface of the target rod 238 and a scandium layer 242 adjacent to the titanium layer 244 facing the ion source 236. The titanium layer 244 can be a first metal layer of the target 240 and the scandium layer 242 can be a second metal layer. Rather than a titanium layer, the first metal layer may alternatively be a yttrium layer, a zirconium layer, a vanadium layer, or any other suitable metal layer. So, an ion beam generated by the ion source 236 can be incident on the scandium layer 242. The scandium layer 242 may be useable as the target 240 without the titanium layer 244 between the scandium layer 242 and the target rod 238, but the scandium layer 242 may not adhere well to the target rod 238 without the titanium layer 244. In addition, the target 240 may include the titanium layer 244 for other benefits. For example, the titanium layer 244 may provide an efficient diffusion barrier for hydrogen, meaning that the $D_2$ and $T_2$ gas in the titanium layer 244 does not tend to drift through the interface from the titanium layer 244 and into the target rod 238, and thus does not deplete the gas loaded in both the titanium layer 244 and the scandium layer 242.

The gas reservoir 234 and the target rod 238 can be positioned at opposite ends of the housing 232. The gas reservoir 234 can be pre-filled with deuterium and tritium gas and can be placed in proximity to the ion source 236. In addition, the target 240 can be loaded with the same gas. The ion source 236 can generate an ion beam of $D_2$ and $T_2$ atomic and molecular ions that can pass through an opening of the suppressor 246 and be incident on the target 240. Upon reaching the target 240, the ions can be incident on the scandium layer 242. As a result, D-T or T-D fusion reactions can occur at a given high voltage to generate neutrons.

Since scandium has a lower mass density than titanium, the incident ions can penetrate deeper into the scandium layer 242 to bombard more target gas particles for fusion reactions to generate more neutrons than if the target 240 was solely a titanium layer. Further, titanium starts to degas $D_2$ and $T_2$ gas embedded in the target at 200° C. or higher, whereas scandium starts to degas at 450° C. or higher, which is at least 250° C. higher than titanium. So, the target $D_2$ and $T_2$ gas content and hence the neutron yield may be stable regardless of temperature rises due to the ion bombardment at the target 240, especially during operations at elevated temperatures. In addition, scandium may erode more slowly than titanium during ions bombardment. Thus, scandium may be a more desirable material for receiving the ion beam than titanium.

Figure 3:
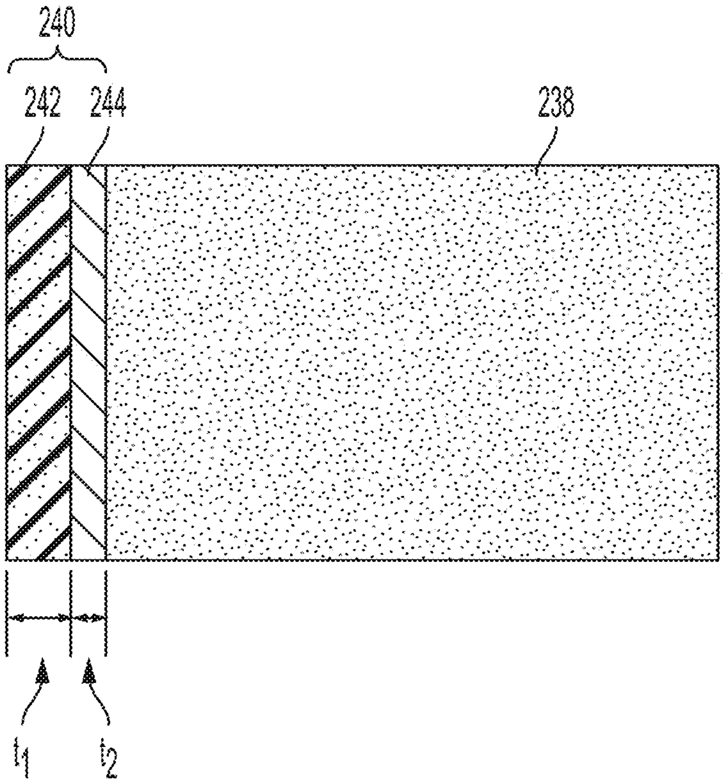
FIG. 3 is a side view of a scandium target for a neutron generator according to one example of the present disclosure.

FIG. 3 is a side view of a target 240 including a scandium layer 242 for a neutron generator according to one example of the present disclosure. The target 240 can be positioned on surface of a target rod 238. The target 240 can include a titanium layer 244 positioned between the target rod 238 and the scandium layer 242. The scandium layer 242 can be thicker than the titanium layer 244. For example, in a compact DT neutron generator operating with a voltage of 100-300 kV, an ion beam of 100-500 μA current, a typical thickness ($t_2$) for the titanium layer 244 may be 0.05-1.0 μm and a typical thickness ($t_1$) for the scandium layer 242 may be 0.5-5.0 μm. In addition, a diameter of the target 240, and the target rod 238, can be between 3-20 mm.

In a particular example with the scandium layer 242 of 1.5 μm in thickness combined with the titanium layer 244 of 0.5 μm in thickness, both with a diameter of 8 mm, the total loaded $D_2$ and $T_2$ gas inside the target 240 can be ~110 torr-cc, which is equivalent to 180 mCi tritium mixed with the same amount deuterium gas. A neutron tube, which is loaded with tritium in a range of 300 mCi-3.0 Ci and the same amount of deuterium, can have enough gas to saturate the target 240, and have enough left-over gas stored in its gas reservoir for operation.

Figure 4:
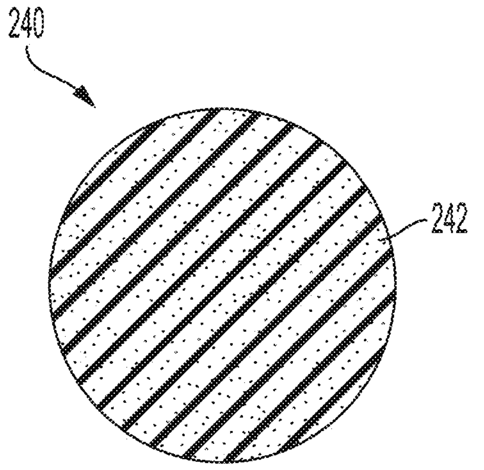
FIG. 4 is a front view of an example of a scandium target for a neutron generator according to one example of the present disclosure.
Figure 5:
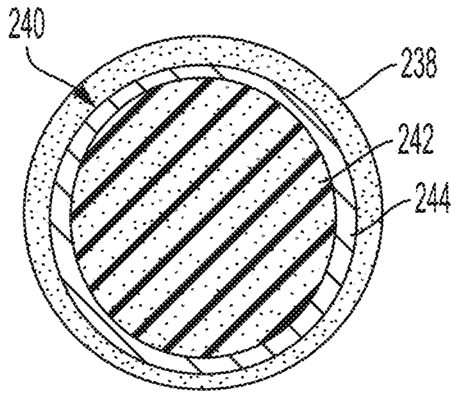
FIG. 5 is a front view of another example of a scandium target for a neutron generator according to one example of the present disclosure.

FIGS. 4 and 5 are front views of targets 240 with scandium layers 242 for a neutron generator according to examples of the present disclosure. As illustrated in FIG. 4, the scandium layer 242 may have a same diameter as a titanium layer of the target 240 and as a target rod. Alternatively, as illustrated in FIG. 5, the scandium layer 242 may have a smaller diameter than the titanium layer 244. In addition, the titanium layer 244 can have a smaller diameter than the target rod 238 on which the target 240 can be positioned. The scandium layer 242, the titanium layer 244, and the target rod 238 can be co-located such that they share a central axis.

Figure 6:
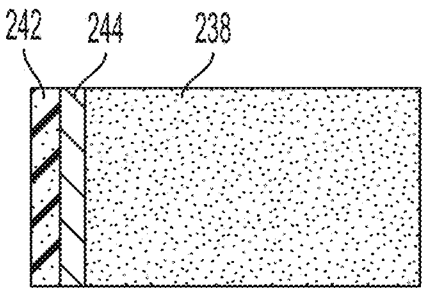
FIG. 6 is a side view of an example of a target with a scandium layer for a neutron generator according to one example of the present disclosure.
Figure 7:
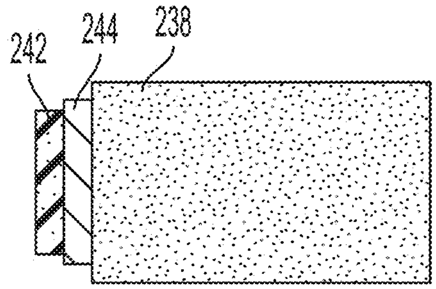
FIG. 7 is a side view of another example of a target with a scandium layer for a neutron generator according to one example of the present disclosure.
Figure 8:
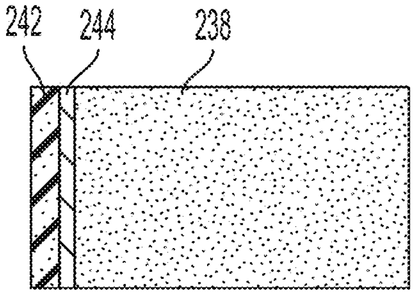
FIG. 8 is a side view of another example of a target with a scandium layer for a neutron generator according to one example of the present disclosure.
Figure 9:
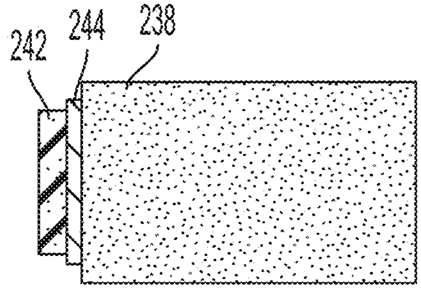
FIG. 9 is a side view of another example of a target with a scandium layer for a neutron generator according to one example of the present disclosure.
Figure 10:
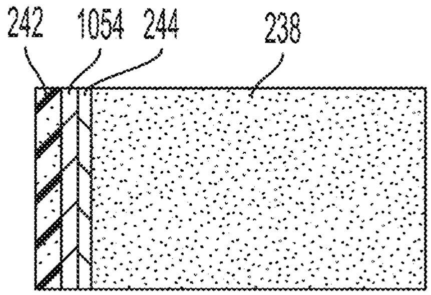
FIG. 10 is a side view of another example of a target with a scandium layer and a chromium layer for a neutron generator according to one example of the present disclosure.

FIGS. 6-11 are side views of targets 240 with scandium layers 242 for a neutron generator according to examples of the present disclosure. In each of FIGS. 6-11, a titanium layer 244 is positioned between a target rod 238 and the scandium layer 242, such that incident ion beams of the neutron generator are incident on the scandium layer 242. In FIGS. 6, 8, and 10, the scandium layers 242 are a same diameter as a titanium layer 244 and a target rod 238, whereas in FIGS. 7, 9, and 11, the scandium layer 242 has a smaller diameter than the titanium layer 244 and the target rod 238. In addition, the scandium layer 242 in FIGS. 8-11 are thicker than the titanium layer 244 in FIGS. 8-11.

Figure 11:
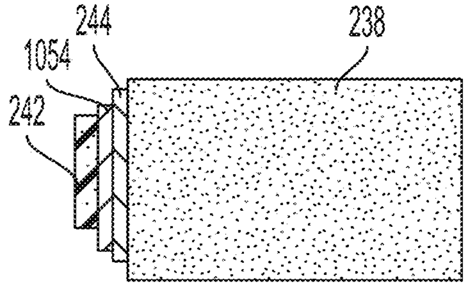
FIG. 11 is a side view of another example of a target with a scandium layer and a chromium layer for a neutron generator according to one example of the present disclosure.

In some examples, the target can also include a third metal layer, which is illustrated as chromium layer 1054, between the scandium layer 242 and the titanium layer 244, as illustrated in FIGS. 10-11. The chromium layer 1054 may help the scandium layer 242 adhere better to the titanium layer 244. The chromium layer 1054 may have a thickness smaller than the thickness of the scandium layer 242. For example, the thickness of the chromium layer 1054 may be between 0.05-0.5 μm. The chromium layer 1054 may have a same diameter as the scandium layer 242 and the titanium layer 244, as illustrated in FIG. 10. Alternatively, the chromium layer 1054 may have a diameter that is larger than the diameter of the scandium layer 242 and smaller than the diameter of the titanium layer 244, as illustrated in FIG. 11.

Figure 12:
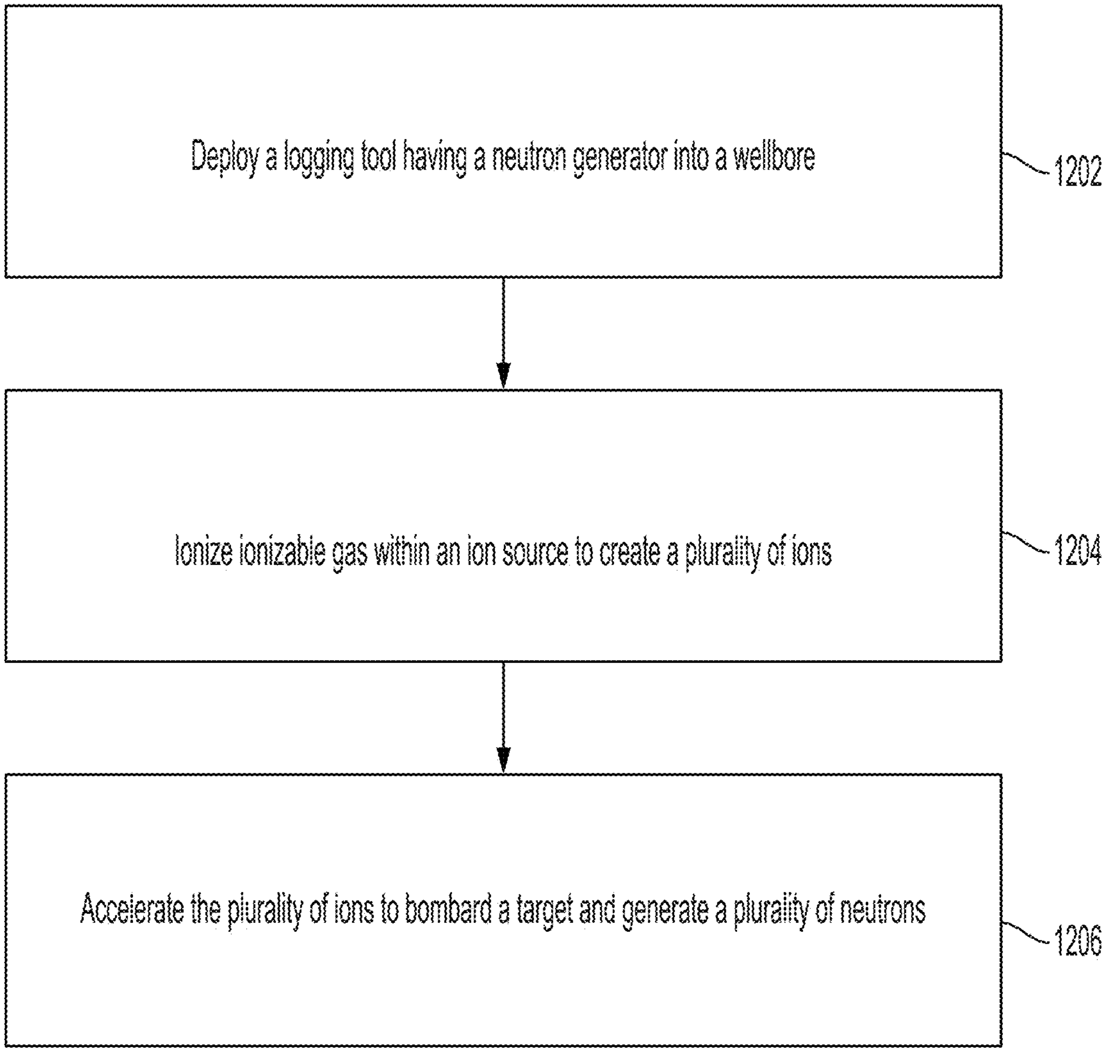
FIG. 12 is a flowchart of a process for using a neutron generator with a scandium target according to one example of the present disclosure.

FIG. 12 is a flowchart of a process for using a neutron generator with a scandium target according to one example of the present disclosure. Other examples can involve more operations, fewer operations, different operations, or a different order of the operations shown in FIG. 12. The operations of FIG. 12 are described below with reference to the components shown in FIG. 2.

At block 1202, a logging tool having a neutron generator 230 is deployed into a wellbore. The logging tool may be downhole tool 118 in FIG. 1. The neutron generator 230 can include a housing 232 of a vacuum enclosure having glass or ceramic walls, a gas reservoir 234 positioned within the housing 232, a target rod 238 positioned within the housing 232 and having a longitudinal axis aligned with a central axis of the housing 232, a target 240 positioned on a surface of the target rod 238 facing the ion source 236, and an ion source 236 positioned between the target 240 and the gas reservoir 234. The target 240 can include a first metal layer, such as titanium layer 244, on the surface of the target rod 238 and a second metal layer, such as scandium layer 242, positioned adjacent to the titanium layer 244 facing the ion source 236. The scandium layer 242 and the titanium layer 244 may have a same diameter, or the scandium layer 242 may have a smaller diameter than the titanium layer 244. In addition, the scandium layer 242 and the titanium layer 244 may have a same thickness, or the scandium layer 242 may have a larger thickness than the titanium layer 244.

At block 1204, ionizable gas is ionized within the ion source 236 to create a plurality of ions. The ionizable gas can be a mixture of deuterium gas and tritium gas stored in the gas reservoir 234 that can be accelerated by the ion source 236 to form an ion beam of the plurality of ions. As a particular example, the ion beam may be one-hundred μA.

At block 1206, the plurality of ions are accelerated to bombard the target 240 and generate a plurality of neutrons. The target 240 may face a thermal heating of 10 W power caused by the ion beam bombardment with a current of one-hundred μA at a voltage of one-hundred kV. Having the ion beam being incident on the scandium layer 242 may reduce issues, such as secondary electron emission, target material sputtering or erosion, target temperature rise and degassing, particularly at elevated ambient temperatures. So, operational instabilities, degradations, and tube lifetime may be improved with use of the scandium layer 242.

In some aspects, a downhole neutron generator, a method, and a neutron generator for a logging tool are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a downhole neutron generator comprising: a housing; a gas reservoir positionable within the housing; a target rod positionable within the housing and having a longitudinal axis aligned with a central axis of the housing; an ion source positionable adjacent to the gas reservoir and between the target rod and the gas reservoir; and a target positionable on a surface of the target rod facing the ion source, the target including a first metal layer on the surface of the target rod and a second metal layer positionable adjacent to the first metal layer facing the ion source, the second metal layer being a scandium layer.

Example 2 is the downhole neutron generator of example 1, wherein a first diameter of the scandium layer is equal to or smaller than a second diameter of the first metal layer.

Example 3 is the downhole neutron generator of examples 1-2, wherein the target further comprises a third metal layer positionable between the scandium layer and the first metal layer.

Example 4 is the downhole neutron generator of example 3, wherein a third diameter of the third metal layer is equal to or greater than a first diameter of the scandium layer and equal to or less than a second diameter of the first metal layer.

Example 5 is the downhole neutron generator of examples 1-4, further comprising a suppressor configured to encapsulate the target and at least a portion of the target rod.

Example 6 is the downhole neutron generator of example 5, further comprising a corona shield for coupling the suppressor to a voltage source positionable external to the housing.

Example 7 is the downhole neutron generator of examples 1-6, wherein the ion source includes an ionizable gas comprising at least one of deuterium gas, tritium gas, or a combination thereof.

Example 8 is a method comprising: deploying a logging tool having a neutron generator into a wellbore, the neutron generator comprising: a housing; a gas reservoir positionable within the housing; a target rod positionable within the housing and having a longitudinal axis aligned with a central axis of the housing; an ion source positionable adjacent to the gas reservoir and between the target rod and the gas reservoir; a target positionable on a surface of the target rod facing the ion source, the target including a first metal layer on the surface of the target rod and a second metal layer positionable adjacent to the first metal layer facing the ion source, the second metal layer being a scandium layer; and ionizing ionizable gas within the ion source to create a plurality of ions; and accelerating the plurality of ions to bombard the target and generate a plurality of neutrons.

Example 9 is the method of example 8, further comprising: transmitting the plurality of neutrons from the neutron generator into a formation surrounding the wellbore; and receiving a signal measurement related to the plurality of neutrons at one or more sensors in the logging tool.

Example 10 is the method of examples 8-9, wherein a first diameter of the scandium layer is equal to or smaller than a second diameter of the first metal layer.

Example 11 is the method of examples 8-10, wherein the target further comprises a third metal layer positionable between the scandium layer and the first metal layer.

Example 12 is the method of example 11, wherein a third diameter of the third metal layer is equal to or greater than a first diameter of the scandium layer and equal to or less than a second diameter of the first metal layer.

Example 13 is the method of examples 8-12, wherein the neutron generator further comprises a suppressor configured to encapsulate the target and at least a portion of the target rod.

Example 14 is the method of example 13, wherein the neutron generator further comprises a corona shield for coupling the suppressor to a voltage source positionable external to the housing.

Example 15 is the method of examples 8-14, wherein the ionizable gas comprises at least one of deuterium gas, tritium gas, or a combination thereof.

Example 16 is a neutron generator for a logging tool, the neutron generator comprising: a target rod positionable within a housing and having a longitudinal axis aligned with a central axis of the housing; and a target positionable on a surface of the target rod facing an ion source, the target including a first metal layer on the surface of the target rod and a second metal layer positionable adjacent to the first metal layer facing the ion source, the second metal layer being a scandium layer.

Example 17 is the neutron generator for the logging tool of example 16, wherein the neutron generator further comprises: the ion source positionable adjacent to a gas reservoir and between the target and the gas reservoir.

Example 18 is the neutron generator for the logging tool of examples 16-17, wherein a first diameter of the scandium layer is equal to or smaller than a second diameter of the first metal layer.

Example 19 is the neutron generator for the logging tool of example 18, wherein the target further comprises: a third metal layer positionable between the scandium layer and the first metal layer, wherein a third diameter of the third metal layer is equal to or greater than the first diameter and equal to or less than the second diameter.

Example 20 is the neutron generator for the logging tool of examples 16-19, wherein the neutron generator further comprises: a suppressor configured to encapsulate the target and at least a portion of the target rod.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A downhole neutron generator comprising:
a housing;
a gas reservoir positionable within the housing;
a target rod positionable within the housing and having a longitudinal axis aligned with a central axis of the housing;
an ion source positionable adjacent to the gas reservoir and between the target rod and the gas reservoir; and
a target positionable on a surface of the target rod facing the ion source, the target including a first metal layer on the surface of the target rod and a second metal layer positionable adjacent to the first metal layer facing the ion source, the second metal layer being a scandium layer and having a thickness that is in a range of 0.5 μm to 5.0 μm.

2. The downhole neutron generator of claim 1, wherein a first diameter of the scandium layer is equal to or smaller than a second diameter of the first metal layer.

3. The downhole neutron generator of claim 1, wherein the target further comprises:
a third metal layer positionable between the scandium layer and the first metal layer.

4. The downhole neutron generator of claim 3, wherein a third diameter of the third metal layer is equal to or greater than a first diameter of the scandium layer and equal to or less than a second diameter of the first metal layer.

5. The downhole neutron generator of claim 1, further comprising:
a suppressor configured to encapsulate the target and at least a portion of the target rod.

6. The downhole neutron generator of claim 5, further comprising:
a corona shield for coupling the suppressor to a voltage source positionable external to the housing.

7. The downhole neutron generator of claim 1, wherein the ion source includes an ionizable gas comprising at least one of deuterium gas, tritium gas, or a combination thereof.

8. The downhole neutron generator of claim 1, wherein the first metal layer is configured to provide a diffusion barrier to the target rod and to absorb first gas for generating first neutrons, and wherein the second metal layer is configured to absorb second gas for generating second neutrons.

9. A method comprising:
deploying a logging tool having a neutron generator into a wellbore, the neutron generator comprising:
a housing;
a gas reservoir positionable within the housing;
a target rod positionable within the housing and having a longitudinal axis aligned with a central axis of the housing;
an ion source positionable adjacent to the gas reservoir and between the target rod and the gas reservoir;
a target positionable on a surface of the target rod facing the ion source, the target including a first metal layer on the surface of the target rod and a second metal layer positionable adjacent to the first metal layer facing the ion source, the second metal layer being a scandium layer and having a thickness that is in a range of 0.5 μm to 5.0 μm; and
ionizing ionizable gas within the ion source to create a plurality of ions; and
accelerating the plurality of ions to bombard the target and generate a plurality of neutrons.

10. The method of claim 9, further comprising:
transmitting the plurality of neutrons from the neutron generator into a formation surrounding the wellbore; and
receiving a signal measurement related to the plurality of neutrons at one or more sensors in the logging tool.

11. The method of claim 9, wherein a first diameter of the scandium layer is equal to or smaller than a second diameter of the first metal layer.

12. The method of claim 9, wherein the target further comprises:
a third metal layer positionable between the scandium layer and the first metal layer.

13. The method of claim 12, wherein a third diameter of the third metal layer is equal to or greater than a first diameter of the scandium layer and equal to or less than a second diameter of the first metal layer.

14. The method of claim 9, wherein the neutron generator further comprises:
a suppressor configured to encapsulate the target and at least a portion of the target rod.

15. The method of claim 14, wherein the neutron generator further comprises:
a corona shield for coupling the suppressor to a voltage source positionable external to the housing.

16. The method of claim 9, wherein the ionizable gas comprises at least one of deuterium gas, tritium gas, or a combination thereof.

17. A neutron generator for a logging tool, the neutron generator comprising:
a target rod positionable within a housing and having a longitudinal axis aligned with a central axis of the housing; and
a target positionable on a surface of the target rod facing an ion source, the target including a first metal layer on the surface of the target rod and a second metal layer positionable adjacent to the first metal layer facing the ion source, the second metal layer being a scandium layer and having a thickness that is in a range of 0.5 μm to 5.0 μm.

18. The neutron generator for the logging tool of claim 17, wherein the neutron generator further comprises:
the ion source positionable adjacent to a gas reservoir and between the target and the gas reservoir.

19. The neutron generator for the logging tool of claim 17, wherein a first diameter of the scandium layer is equal to or smaller than a second diameter of the first metal layer.

20. The neutron generator for the logging tool of claim 19, wherein the target further comprises:
a third metal layer positionable between the scandium layer and the first metal layer, wherein a third diameter of the third metal layer is equal to or greater than the first diameter and equal to or less than the second diameter.

* * * * *